US012812248B2

(12) United States Patent
Feng et al.

(10) Patent No.: US 12,812,248 B2
(45) Date of Patent: Nov. 24, 2026

(54) DYNAMIC IMAGE SENSOR CONFIGURATION FOR IMPROVED IMAGE STABILIZATION IN AN IMAGE CAPTURE DEVICE

(71) Applicant: QUALCOMM Incorporated, San Diego, CA (US)

(72) Inventors: Wen-Chun Feng, New Taipei City (TW); Jun-Zuo Liu, Taipei City (TW); Wei-Chih Liu, Taipei City (TW); Quanmin Shen, Shenzhen (CN); Zhongshan Wang, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 18/863,277

(22) PCT Filed: Jul. 29, 2022

(86) PCT No.: PCT/CN2022/109089

§ 371 (c)(1),
(2) Date: Nov. 5, 2024

(87) PCT Pub. No.: WO2024/021057

PCT Pub. Date: Feb. 1, 2024

(65) Prior Publication Data

US 2025/0301221 A1 Sep. 25, 2025

(51) Int. Cl.

*H04N 23/68* (2023.01)
*H04N 7/01* (2006.01)

(Continued)

(52) U.S. Cl.

CPC ......... *H04N 23/684* (2023.01); *H04N 7/0127* (2013.01); *H04N 23/683* (2023.01); *H04N 23/76* (2023.01); *H04N 23/667* (2023.01)

(58) Field of Classification Search

None

See application file for complete search history.

(56) References Cited

U.S. PATENT DOCUMENTS

| | | | | |
|---|---|---|---|---|
| 2007/0104462 A1 | 5/2007 | Saito et al. | | |
| 2010/0177239 A1 * | 7/2010 | Servais | .................. | H04N 7/014 348/E7.003 |

(Continued)

FOREIGN PATENT DOCUMENTS

| | | |
|---|---|---|
| CN | 107864341 A | 3/2018 |
| CN | 113766313 A | 12/2021 |

OTHER PUBLICATIONS

International Search Report and Written Opinion—PCT/CN2022/109089—ISA/EPO—Apr. 10, 2023.

*Primary Examiner* — Quan Pham

(74) *Attorney, Agent, or Firm* — QUALCOMM Incorporated

(57) ABSTRACT

This disclosure provides systems, methods, and devices for image processing that support improved image quality. In a first aspect, a method of image processing includes determining a scene condition for an image sensor of an image capture device; receiving motion data regarding movement of the image capture device; configuring the image sensor of the image capture device with a first image sensor configuration determined based on the motion data and the scene condition; receiving image data from the image sensor captured with the first image sensor configuration; and determining a video sequence by processing the image data based on the motion data and the scene condition. Other aspects and features are also claimed and described.

28 Claims, 8 Drawing Sheets

(51) Int. Cl.
*H04N 23/667* (2023.01)
*H04N 23/76* (2023.01)

(56) References Cited

U.S. PATENT DOCUMENTS

| | | | | |
|---|---|---|---|---|
| 2012/0162462 | A1 | 6/2012 | Takeuchi | |
| 2018/0227502 | A1* | 8/2018 | Menachem | H04N 23/951 |
| 2021/0400185 | A1* | 12/2021 | Price | H04N 25/46 |
| 2025/0225663 | A1* | 7/2025 | Lu | G06T 7/248 |

* cited by examiner

DYNAMIC IMAGE SENSOR CONFIGURATION FOR IMPROVED IMAGE STABILIZATION IN AN IMAGE CAPTURE DEVICE

CROSS-REFERENCE TO RELATED APPLICATIONS

This application claims the benefit of International Patent Application No. PCT/CN2022/109089, entitled, "DYNAMIC IMAGE SENSOR CONFIGURATION FOR IMPROVED IMAGE STABILIZATION IN AN IMAGE CAPTURE DEVICE," filed on Jul. 29, 2022, which is expressly incorporated by reference herein in its entirety.

TECHNICAL FIELD

Aspects of the present disclosure relate generally to image processing, and more particularly, to improving image quality by reducing undesired motion artifacts. Some features may enable and provide improved image processing, including improved appearance of photographs of subjects and objects in a scene while the camera is in motion.

INTRODUCTION

Image capture devices are devices that can capture one or more digital images, whether still image for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

Image capture devices capture sequences of images with each image corresponding to an appearance of a scene at a particular time, such that when the images are viewed in a sequence the sequence appears as a video showing the motion of objects in the scene. The smoothness of the video depends on the rate of the capture of individual images. The faster the individual image are captured, the smoother the video appears because the movement of objects is better captured as small movements. One frame rate used by image capture devices is 30 frames per second (fps), in which an image is captured thirty times per second or about every 33 milliseconds.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The amount of light that can be captured by an image sensor is, in part, proportional to the length of time that light is collected by the image sensor. At the example rate of 30 frames per second, the amount of time for an image sensor to collect light is limited to 33 milliseconds. This time limit can result in low quality images in certain scene conditions, such as low light scene conditions in dark rooms. Decreasing the frame rate increases the time available to capture light for each image frame in the sequence. For example, the frame duration increases to 66 milliseconds at a frame rate of 15 fps. The lower frame rate can improve low light photography but the lower frame rate results in increased video judder artifacts that reduce the appearance of the video. Video judder artifacts appear as abrupt movements when objects appear to shift location without intermediate positions.

Aspects of this disclosure allow operation of an image sensor at lower frame rates to provide for longer frame durations with reduced video judder artifacts. When certain conditions are met, the frame rate may be reduced and frame rate conversion (FRC) applied to the images captured at the reduced frame rate to increase the frame to a higher rate. The use of frame rate conversion (FRC) in these conditions allows for improved image capture in, for example, low light conditions, where the longer frame duration provides for higher signal quality from the image sensor.

The condition for entering this mode of operation with a lower frame rate image capture and frame rate conversion may be based on motion data such that this mode of operation is used when motion would not result in significant increase in video judder artifacts at the lower frame rate. For example, motion data from sensors in the image capture device may be used to determine when the image capture device is slowly or not moving such that the objects in the scene may be determined to not be quickly moving location. As another example, motion data from captured image frames may be used to determine an amount of object motion in the scene and the low frame rate mode of operation used when objects have limited or low movement in the scene.

The use of the lower frame rate and frame rate conversion improves the trade-off between signal-to-noise ratio (SNR), frame rate, and motion blur. Dynamic control over the frame rate or other aspects of an image sensor configuration, the activation of frame rate conversion, and the configuration of the frame rate conversion allows an image capture device to advantageously use longer frame duration for image exposure without significantly increasing motion blur or breakage between image frames.

In one aspect of the disclosure, a method for image processing includes determining a scene condition for an image sensor of an image capture device; receiving motion data regarding movement of the image capture device; configuring the image sensor of the image capture device with a first image sensor configuration determined based on the motion data and the scene condition; receiving image data from the image sensor captured with the first image sensor configuration; and determining a video sequence by processing the image data based on the motion data and the scene condition.

In an additional aspect of the disclosure, an apparatus includes at least one processor and a memory coupled to the at least one processor. The at least one processor is configured to perform operations including determining a scene condition for an image sensor of an image capture device; receiving motion data regarding movement of the image capture device; configuring the image sensor of the image capture device with a first image sensor configuration determined based on the motion data and the scene condition; receiving image data from the image sensor captured with the first image sensor configuration; and determining a video sequence by processing the image data based on the motion data and the scene condition.

In an additional aspect of the disclosure, an apparatus includes means for determining a scene condition for an image sensor of an image capture device; means for receiving motion data regarding movement of the image capture device; means for configuring the image sensor of the image capture device with a first image sensor configuration determined based on the motion data and the scene condition; means for receiving image data from the image sensor captured with the first image sensor configuration; and means for determining a video sequence by processing the image data based on the motion data and the scene condition.

In an additional aspect of the disclosure, a non-transitory computer-readable medium stores instructions that, when executed by a processor, cause the processor to perform operations. The operations include determining a scene condition for an image sensor of an image capture device; receiving motion data regarding movement of the image capture device; configuring the image sensor of the image capture device with a first image sensor configuration determined based on the motion data and the scene condition; receiving image data from the image sensor captured with the first image sensor configuration; and determining a video sequence by processing the image data based on the motion data and the scene condition.

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

In general, this disclosure describes image processing techniques involving digital cameras having image sensors and image signal processors (ISPs). The ISP may be configured to control the capture of image frames from one or more image sensors and process one or more image frames from the one or more image sensors to generate a view of a scene in a corrected image frame. A corrected image frame may be part of a sequence of image frames forming a video sequence. The video sequence may include other image frames received from the image sensor or other images sensors and/or other corrected image frames based on input from the image sensor or another image sensor. In some embodiments, the processing of one or more image frames may be performed within the image sensor. The image processing techniques described in embodiments disclosed herein may be performed by circuitry in the image sensor, in the image signal processor (ISP), in the application processor (AP), or a combination or two or all of these components.

In an example, the image signal processor may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image frames processed by one or more algorithms within the image signal processor. For example, an image frame obtained from an image sensor, which may have performed some processing on the data before output to the image signal processor may be processed in the image signal processor by processing the image frame through an image post-processing engine (IPE) and/or other image processing circuitry for performing one or more of tone mapping, portrait lighting, contrast enhancement, gamma correction, etc.

After an output image frame representing the scene is determined by the image signal processor using the image correction, such as described in various embodiments herein, the output image frame may be displayed on a device display as a single still image and/or as part of a video sequence, saved to a storage device as a picture or a video sequence, transmitted over a network, and/or printed to an output medium. For example, the image signal processor may be configured to obtain input frames of image data (e.g., pixel values) from the different image sensors, and in turn, produce corresponding output image frames of image data (e.g., preview display frames, still-image captures, frames for video, frames for object tracking, etc.). In other examples, the image signal processor may output image frames of the image data to various output devices and/or camera modules for further processing, such as for 3A parameter synchronization (e.g., automatic focus (AF), automatic white balance (AWB), and automatic exposure control (AEC)), producing a video file via the output image frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output image frames to various output destinations.

In some aspects, the corrected image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of corrected image frames described herein over a wireless communications network such as a 5G NR communication network.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
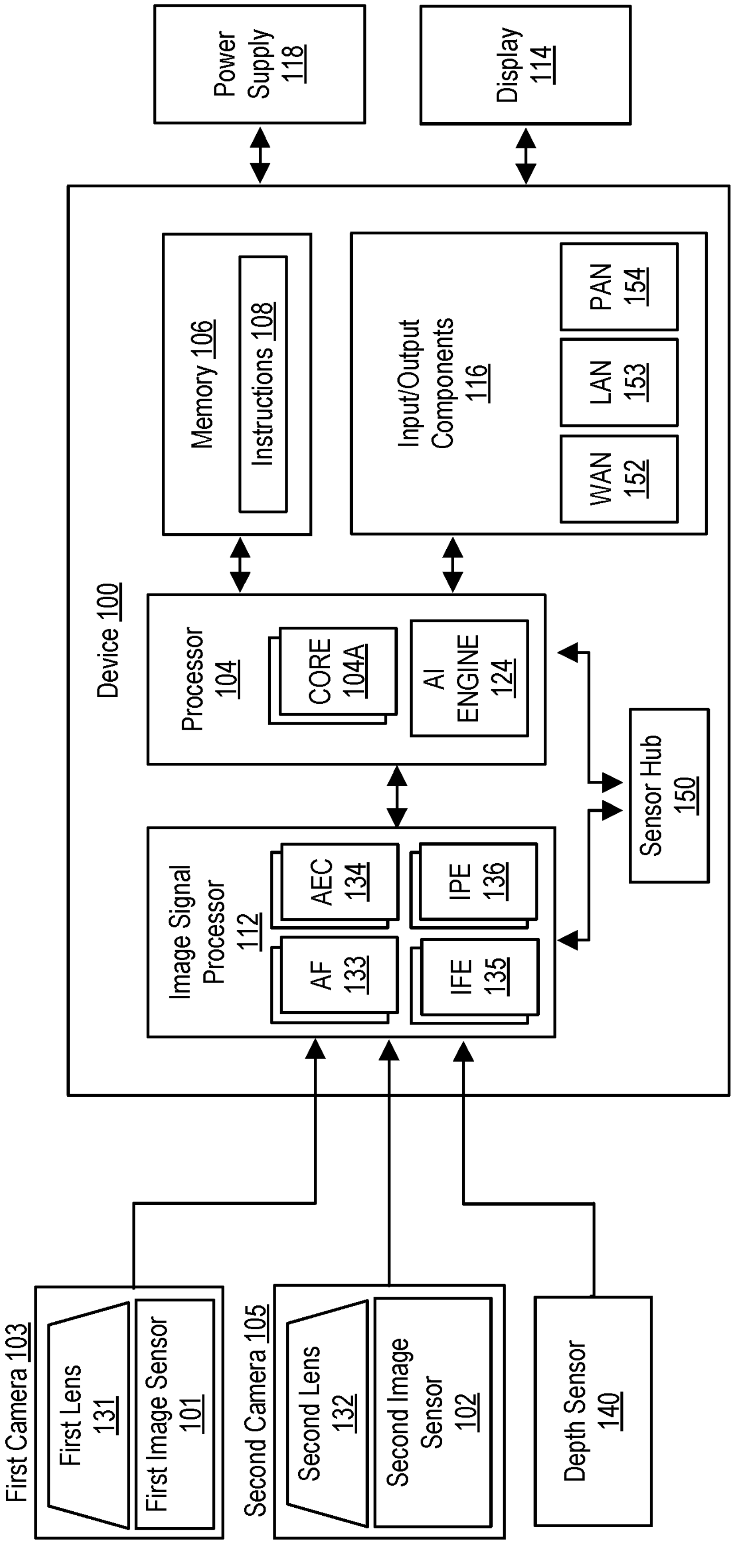
FIG. 1 shows a block diagram of an example device for performing image capture from one or more image sensors according to one or more aspects of the disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved image processing for image capture operations with improved balancing of image characteristics, including signal-to-noise ratio and video judder artifacts. The image capture configuration may be dynamically adjusted based on criteria evaluated by the image capture device in controlling the image capture and image processing operations. The configuration may be dynamically configured based on a determined movement profile of the image capture device and/or scene conditions of the field of view being captured. For example, a low-light scene may benefit from longer frame durations (e.g., lower frame rates) for image capture to improve image quality with frame rate conversion (FRC) applied to the captured lower frame rate image data to increase the frame rate to reduce motion artifacts. The lower frame rate and frame rate conversion may be applied based on determining a scene condition for low-light scene and determining low motion of the image capture device.

Particular implementations of the subject matter described in this disclosure may be implemented to realize one or more of the following potential advantages or benefits. In some aspects, the present disclosure provides techniques for improving image appearance by provide better SNR of a lower frame rate with similarly-smooth video output to that of images captured at higher frame rates. Additionally, the frame rate conversion may be dynamically configured to reduce breakage artifacts when a scene is dynamic in nature to perform motion interpolation.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs) (e.g., AI engines), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons. I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), and/or one or more auto exposure compensation (AEC) 134 engines. The AF 133, AEC 134, IFE 135, IPE 136 may each include application-specific circuitry, be embodied as software code executed by the ISP 112, and/or a combination of hardware within and software code executing on the ISP 112. The ISP 112 may additionally execute an automatic white balancing (AWB) engine for performing white balancing operations. The AWB engine may execute in, for example, the image front ends (IFEs) 135 or other dedicated or general processing circuitry within the ISP 112 or the image capture device 100, such as on a digital signal processor (DSP).

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output image frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein. For example, execution of the instructions can instruct the image signal processor 112 to begin or end capturing an image frame or a sequence of image frames, in which the capture includes operations described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, the camera application may receive a command to begin a video preview display upon which a video comprising a sequence of image frames is captured and processed from one or more image sensors 101 or 102. Image correction, such as with cascaded IPEs, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124) in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
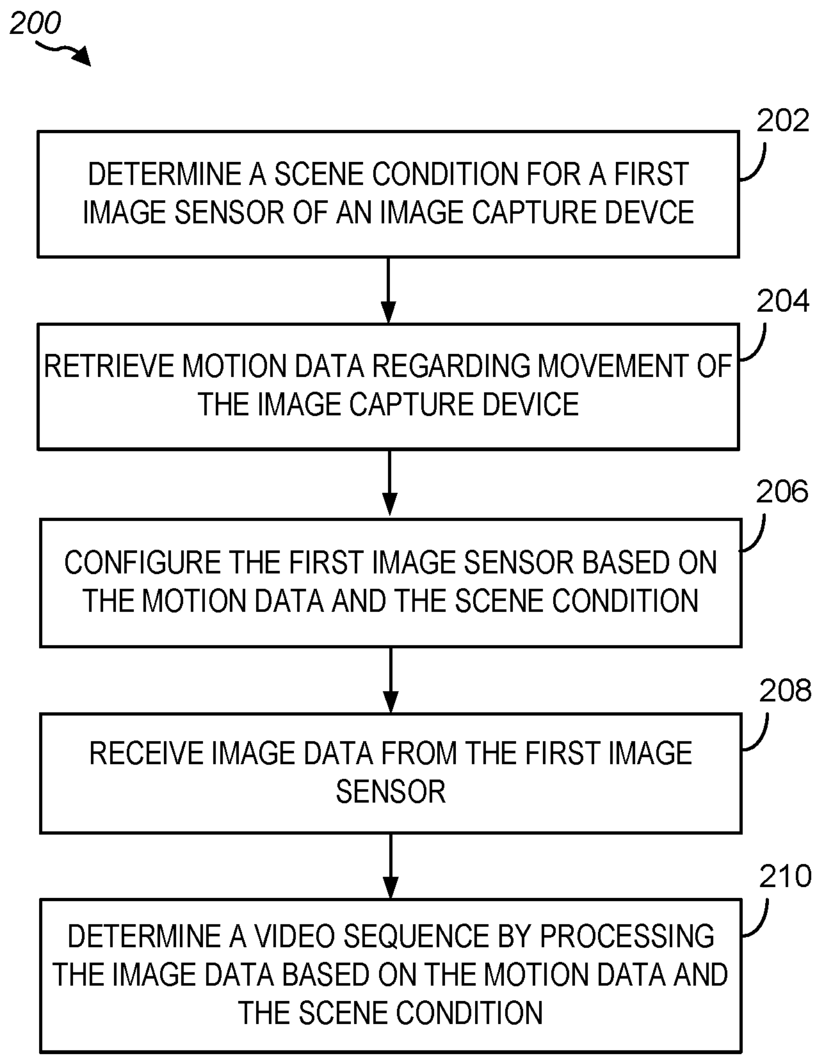
FIG. 2 shows a flow chart of an example method for capturing image data with an image sensor configuration based on scene conditions and motion data according to one or more aspects of the disclosure.

FIG. 2 shows a flow chart of an example method for capturing image data with an image sensor configuration based on scene conditions and motion data according to one or more aspects of the disclosure. The capturing in FIG. 2 may obtain an improved digital representation of a scene, which results in a photograph or video with higher image quality (IQ).

At block 202, method 200 includes, at block 202, a scene condition is determined for a first image sensor of an image capture device. The scene condition may specify, for example, a light condition, an environment, a location, or other information regarding a global characteristic of the scene in the field of view of the first image sensor. The scene condition may be determined by capturing image data and from the image sensor and calculating image statistics on the image data to determine a brightness of the scene. As one example, the image post-processing engine (IPE) 136 may calculate image statistics and determine a lux index for the scene based on the image statistics, in which the lux index represents a scene condition. One or more thresholds may be applied to the lux index to characterize a scene into one or more scene conditions. Lux indexes above a threshold may be characterized as a low-light scene condition, whereas lux indexes below the threshold may be characterized as normal-light scene conditions.

The scene condition may be based on other calculations based on the image data. The scene condition may alternatively or additional be based on data other than image data. For example, scene condition may be based on time data from which an outdoor lighting condition can be determined. One or more thresholds may be applied to the time data to characterize a scene as a daylight scene or a night scene. As another example, scene condition may be based on location data to characterize a scene condition as an indoor scene condition or an outdoor scene condition. In some embodiments, the scene condition for the first image sensor may be determined based on image data captured by a different, second image sensor of the image capture device. For example, when a wide image sensor and a telephoto image sensor have an overlapping field of view and thus a brightness determined from image data collected by the wide image sensor may be used to determine scene conditions of the telephoto image sensor, and vice versa.

At block 204, motion data may be received regarding movement of the image capture device. The motion data may be IMU data received from one or more sensors, which may include gyroscope data, accelerometer data, magnetometer data, and/or OIS data. The motion data may also or alternatively include image data, such as motion vectors computed from image data captured by the first image sensor. The motion data may be used to determine motion of the image capture device. For example, device motion may be inferred as having a magnitude of motion based on a magnitude of motion vectors determined from the image data. As another example, device motion may be inferred as having a magnitude of motion based on a magnitude of motion of a gyroscope. As a further example, device motion may be inferred as having a magnitude of motion based on distance traveled as recorded by a global positioning system (GPS) or other location determination system. As still another example, device motion may be a motion class determined based on the sensor data, in which the motion class may be walking, running, cycling, sitting, or other activity classes.

At block 206, the image sensor may be configured based on the motion data received at block 204 and the scene condition determined at block 202. The image sensor may be configured with a frame duration based on criteria involving the motion data and the scene condition. Frame duration for an image sensor may be configured by setting a frame rate for image capture by the image sensor. A determined configuration may be applied to the image sensor by transmitting a command to the image sensor and/or setting configuration registers of the image sensor. In some embodiments, a frame duration for the image sensor may be increased (such as by decreasing a frame rate) when the scene condition meets a first criteria indicating a low-light condition and the motion data meets a second criteria indicating low motion.

At block 208, image data is received from the first image sensor while configured with the first image sensor. For example, the image data may be captured at a lower frame rate than normal operation, such as a higher frame rate configured prior to block 206.

At block 210, the image data is processed to determine a video sequence, in which the processing is based on the motion data and the scene condition. The processing may include operations in the image front end (IFE) 135, image post-processing engine (IPE) 136, and/or a frame rate converter (FRC). Features within the IFE, IPE, and/or FRC may be activated or deactivated to correspond with the image sensor configuration set at block 206. For example, when the first image sensor is configured at block 206 for a longer frame duration (lower frame rate) then the frame rate converter (FRC) may be enabled at block 210. In some embodiments, the FRC is enabled at block 210 when the image sensor is configured for 15 fps at block 206 and disabled when the image sensor is configured back to 30 fps. The FRC may be configured to increase a frame rate of the image data captured at 15 fps to a higher frame rate of 30 fps, 60 fps, 90 fps, 120 fps, or another value higher than 15 fps.

Figure 3:
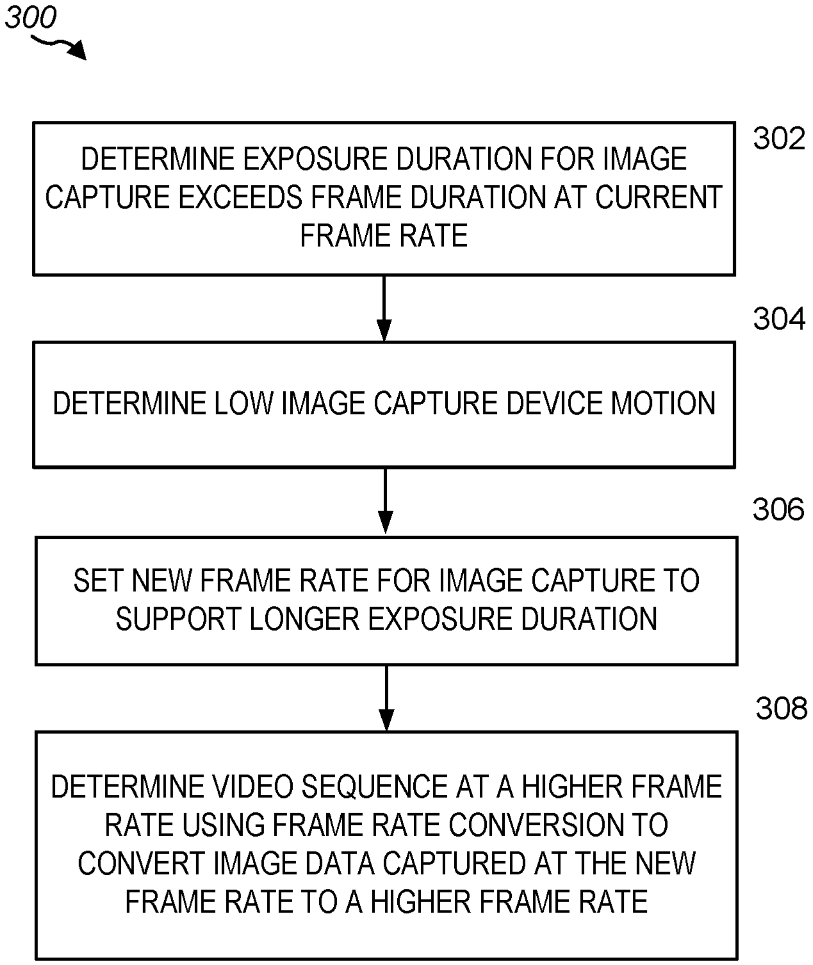
FIG. 3 is a flow chart showing an example method for frame rate control based on lighting condition and motion according to some embodiments of the disclosure.

An example embodiment of the method of FIG. 2 is shown in FIG. 3. FIG. 3 is a flow chart showing an example method for frame rate control based on lighting condition and motion according to some embodiments of the disclosure. Method 300 includes, at block 302, determining an exposure duration for an image capture exceeds a frame duration at a current frame rate. For example, an auto-exposure (AE) algorithm may determine a desired exposure duration for image capture in current scene conditions is longer than a frame duration at a current frame rate. This may occur when the AE algorithm determines an exposure duration of 44 milliseconds when the current frame rate is 30 fps, which only supports a maximum exposure duration of 33 milliseconds. At block 304, a low image capture device motion may be determined. For example, a threshold may be applied to gyroscope data to determine if device motion is below a threshold amount. At block 306, a new frame rate for image capture may be set for the image sensor to support a longer exposure duration by decreasing the frame rate from the current frame rate at block 302. At block 308, image data may be captured at the new frame rate and upconverted to a higher frame rate by frame rate conversion (FRC) processing. In some embodiments, the upconverting returns the processed image data to the frame rate of block 302 before the new frame rate set at block 306.

Figure 4A:
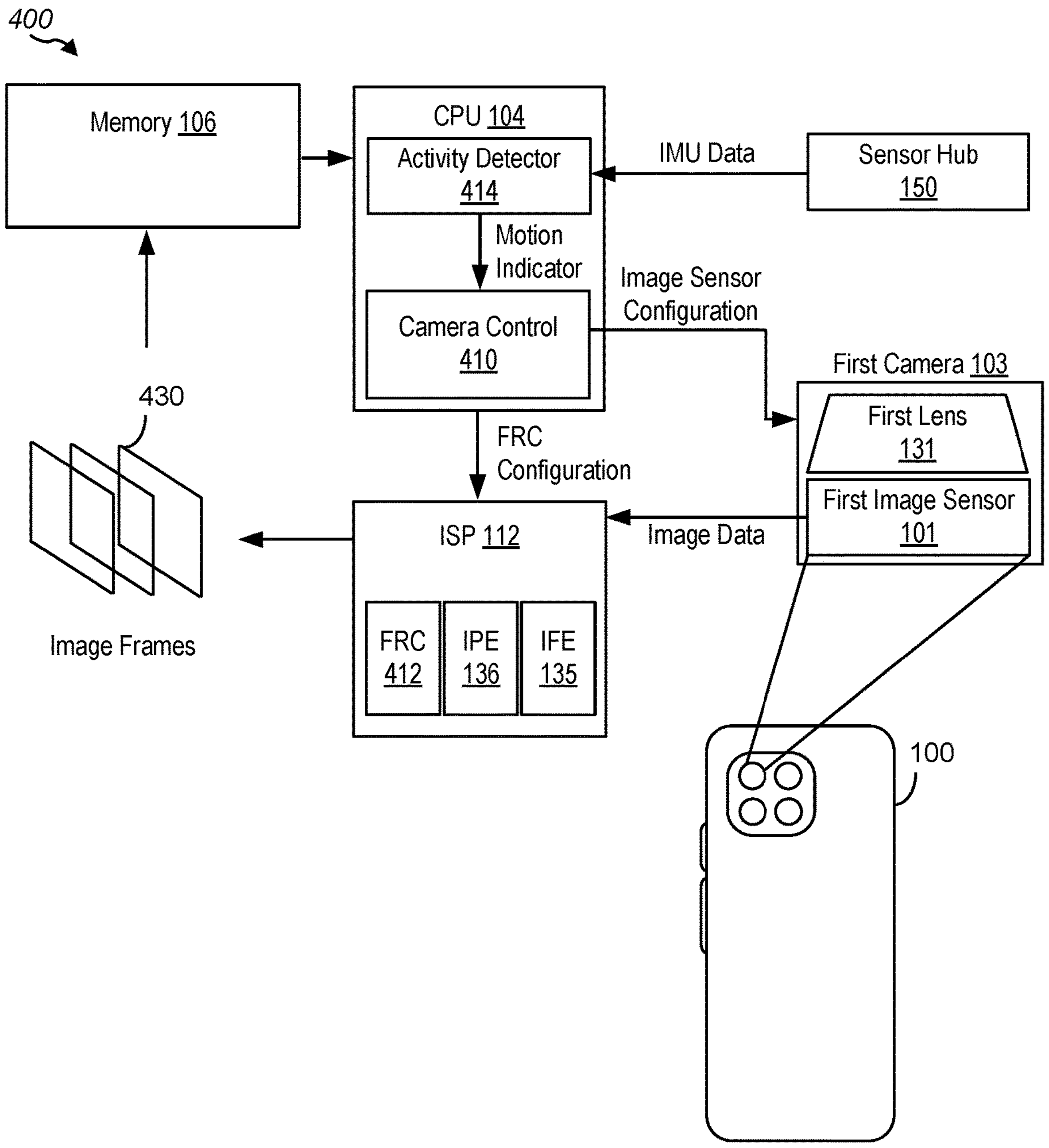
FIG. 4A shows a block diagram of an example processing configuration for processing image data according to one or more aspects of the disclosure.
Figure 4B:
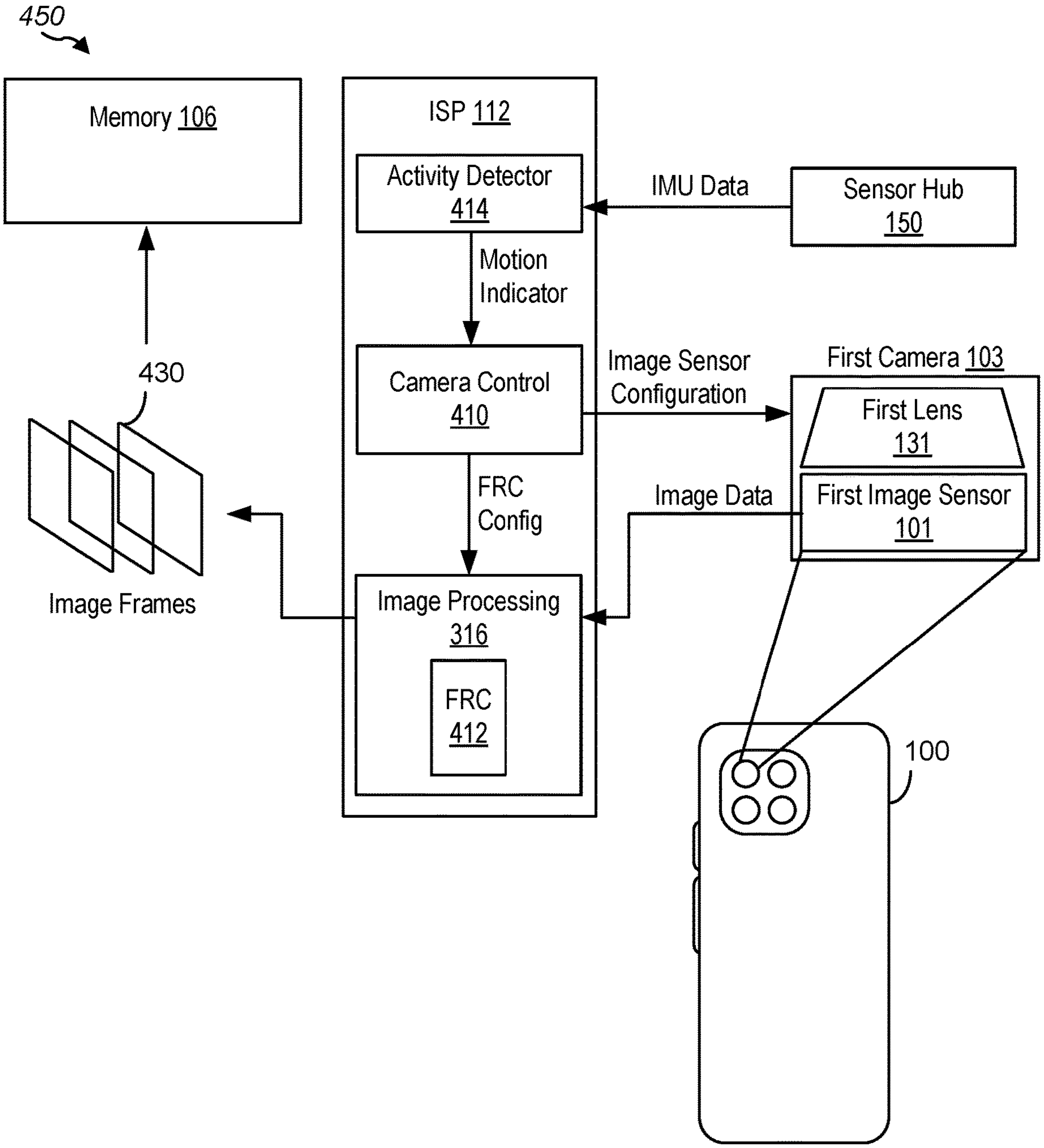
FIG. 4B shows a block diagram of an example processing configuration for processing image data according to one or more aspects of the disclosure.
Figure 4C:
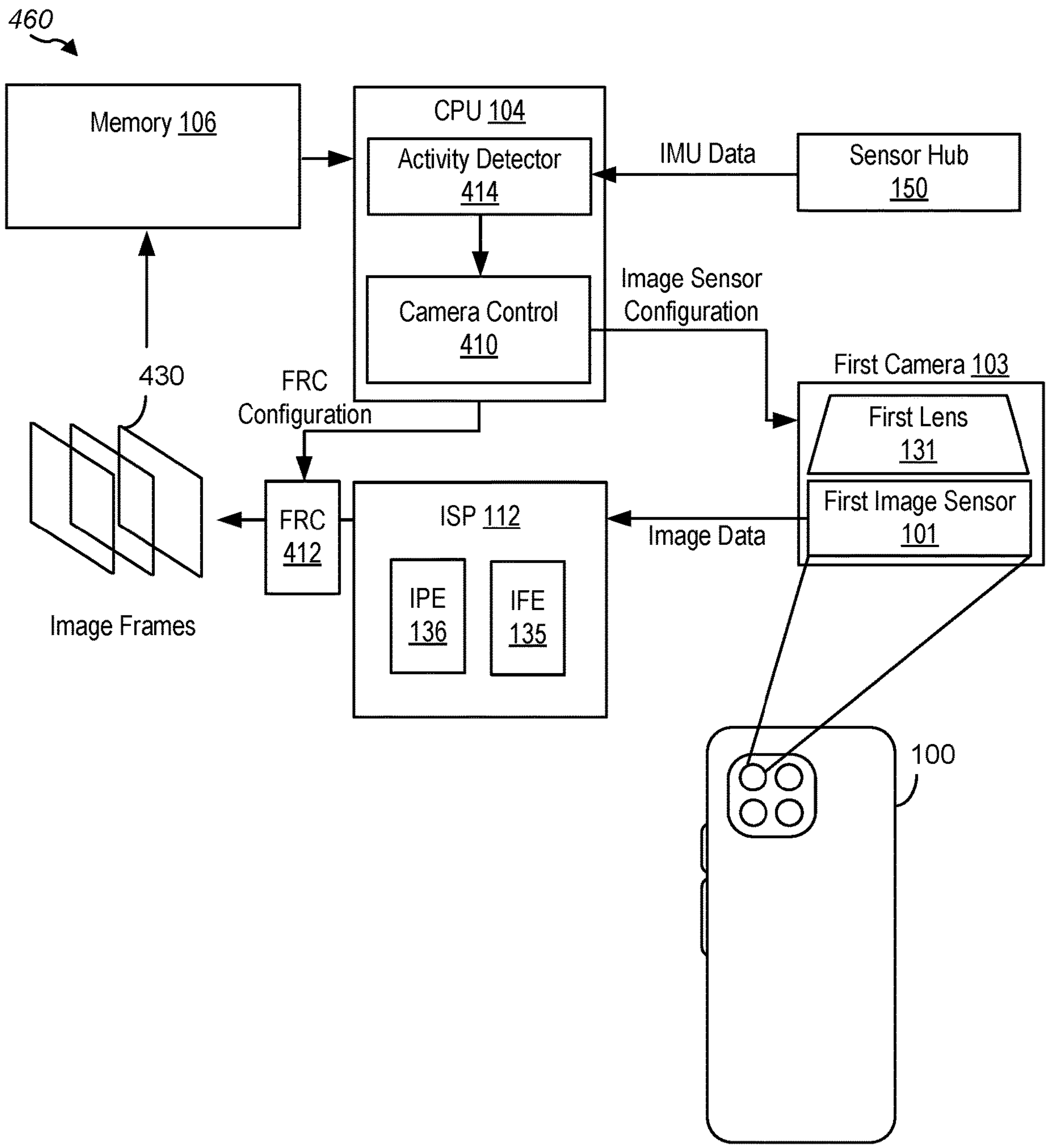
FIG. 4C shows a block diagram of an example processing configuration for processing image data according to one or more aspects of the disclosure.

Some configurations for an image capture device to perform the methods of FIG. 2 or FIG. 3 are shown in FIG. 4A-4C, although the methods are not limited to being performed by the image capture devices of FIGS. 4A-4C.

FIG. 4A shows a block diagram of an example processing configuration for processing image data according to one or more aspects of the disclosure. A processor 104 of system 400 may communicate with image signal processor (ISP)

112 through a bi-directional bus and/or separate control and data lines. The processor 104 may control camera 103 through camera control 410, such as by configuring the camera 103 through a camera driver executing on the processor 104. The configuration may include an image sensor configuration that specifies, for example, a frame duration, a frame rate, an image resolution, a readout duration, an exposure level, an aspect ratio, etc. The camera control 410 may receive motion data from activity detector 414. The activity detector 414 may receive IMU data from the sensor hub 150, which receives data from one or more sensors. The activity detector 414 may receive other motion data from other components, such as an optical image stabilization (OIS) system of a camera. The activity detector 414 may further receive image data from the camera 103 for determining the motion indicator based on motion vectors from the image data. The activity detector 414 may apply thresholds to the motion data to determine a high motion indicator, which the camera control 410 may use in determining an image sensor configuration.

The camera 103 may obtain image data based on the image sensor configuration. For example, the processor 104 may execute a camera application to instruct camera 103 to set a first image sensor configuration for the camera 103, to obtain first image data from the camera 103 operating based on the first image sensor configuration, and/or to instruct camera 103 to set a second image sensor configuration when scene conditions and/or motion data no longer meet respective first and second criteria for operating in low frame rate capture mode with frame rate conversion. The camera control 410 may also apply a FRC configuration to FRC 412 in ISP 112, such as to enable or disable the FRC 412 and/or configure the FRC 412 for a particular conversion technique. The FRC configuration may be applied to FRC 412 to correspond with the image sensor configuration applied to the camera 103. For example, when the first camera is configured for 15 fps, the FRC 412 may be configured to convert the 15 fps output of image data from the camera 103 to 30 fps as output image frames 430 for storage in memory 106.

The image data received from camera 103 may be processed in one or more blocks of the ISP 112 to form image frames 430 that are stored in memory 106 and/or provided to the processor 104. The processor 104 may further process the image data to apply effects to the image frames 430. Effects may include Bokeh, lighting, color casting, and/or high dynamic range (HDR) merging. In some embodiments, functionality for applying effects may be embedded in additional or different components, such as the ISP 112, a DSP, an ASIC, or other custom logic circuit for performing the additional image processing.

The method 200 of FIG. 2 may be configured to perform the operations described with reference to FIG. 2 or FIG. 3 to determine output image frames 430. Other configurations for an image capture device performing the operations of capturing image data at configured frame rates and converting the captured image data to higher frame rates may be used to perform the methods of FIG. 2 or FIG. 3, such as the additional configurations of FIG. 4B and FIG. 4C.

FIG. 4B shows a block diagram of an example processing configuration for processing image data according to one or more aspects of the disclosure. FIG. 4B illustrates system 450, which is similar to the system 400 of FIG. 4A, but uses ISP 112 to determine and apply configurations to the image sensor. In embodiments of the disclosure illustrated in FIG. 4B, sensor data is provided to an activity detector 414 executing in the ISP 112, which provides information to camera control 410. The camera control 410 sets the image sensor configuration for camera 103 and the FRC configuration for FRC 412. The camera control 410 may also other aspects of image processing 316 within the ISP 112, such as by controlling an IFE 135 or IPE 136 in the ISP 112.

FIG. 4C shows a block diagram of an example processing configuration for processing image data according to one or more aspects of the disclosure. FIG. 4C illustrates system 460, which is similar to the system 400 of FIG. 4A, but includes circuitry outside of the ISP 112 and the processor 104 to perform the frame rate conversion operation. For example, FRC 412 may be separate logic circuitry, including a fixed function circuit, a programmable logic circuit, or a combination thereof, to perform frame rate conversion on the output of the ISP 112 and store the upconverted image data at the higher frame rate as output image frames 430 in memory 106. In other embodiments not shown, the system may be configured similar to the system 450 of FIG. 4B with ISP 112 executing camera control 410 but with FRC 412 as separate circuitry. Although shown as separate blocks and separate circuitry in FIG. 4C, the FRC 412 may be included in a system on chip (SoC) or otherwise packaged with semiconductor dies containing the ISP 112, processor 104, and/or memory 106.

Figure 5:
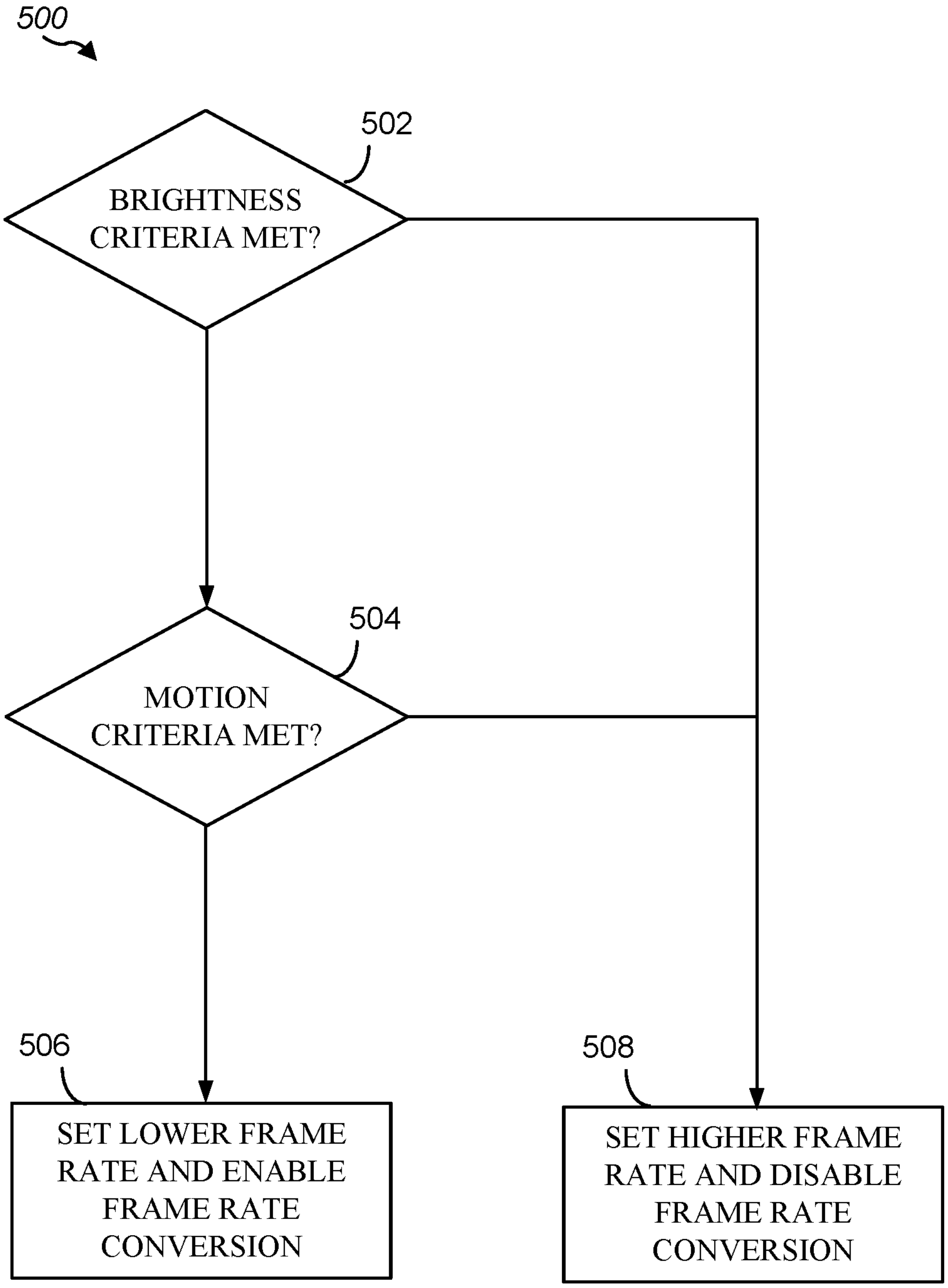
FIG. 5 is a flow chart showing an example determination of an image capture device configuration based on scene condition and motion criteria according to some aspects of the disclosure.

An example method for determining image sensor configuration and FRC configuration for an image capture device are shown in FIG. 5, which may be executed as part of the method shown in FIG. 1 or FIG. 2 by the systems shown in FIGS. 4A-4C. FIG. 5 is a flow chart showing an example determination of an image capture device configuration based on scene condition and motion criteria according to some aspects of the disclosure. A method 500 includes, at block 502, determining whether a scene condition criteria is met. If not, a higher frame rate with no frame rate conversion is set at block 508. Scene conditions in which exposure duration fits within a frame duration of a higher frame rate are captured at the higher frame rate without frame rate conversion to provide further reduced video judder artifacts to improve image quality of a video sequence. If scene condition criteria are met at block 502, at block 504 the image capture device determines whether motion criteria are met. In some embodiments, the motion criteria may include whether a global motion, such as determined from a gyroscope or other device sensor, is below a global threshold and whether a local motion, such as determined from motion vectors in a portion of a scene, is below a local threshold. If not, a higher frame rate with no frame rate conversion is set at block 508. High motion scenes may be better captured at higher frame rates to improve smoothness of the video sequence.

If the scene condition is met at block 502 and the motion criteria is met at block 504, a lower frame rate and frame rate conversion is set at block 506. Under these criteria, low motion and long exposure, the higher signal quality obtained at lower frame rate may produce better image quality and the frame rate conversion reduces some of the video judder effects that occur at the lower frame rate. The dynamic operation of the image capture device to control frame rate and frame rate conversion based on motion data and scene condition improves the overall quality of captured video sequences by prioritizing certain characteristics at the expense of other characteristics. The trade-offs are configured based on the criteria used at blocks 502 and 504, which may be configurable by a manufacturer of the image capture device through firmware settings and/or configurable by a user of the image capture device through camera application settings.

Figure 6:
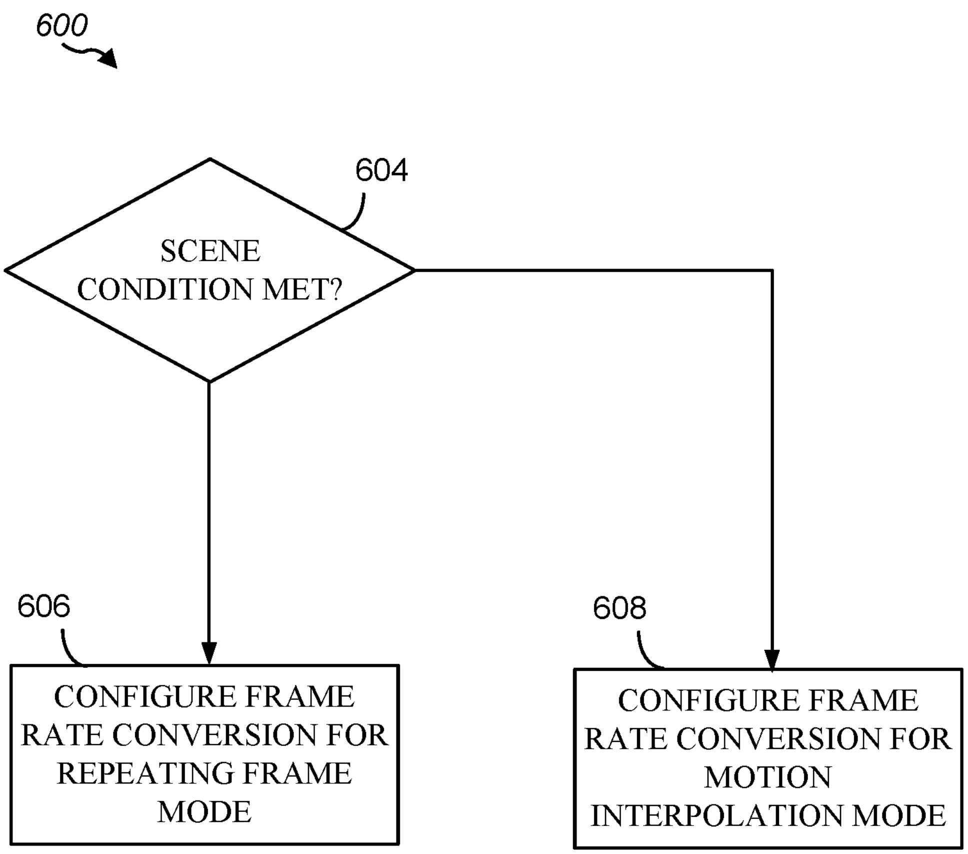
FIG. 6 is a flow chart showing a method for configuring frame rate conversion according to some aspects of the disclosure.

When frame rate conversion is activated, such as at block 508 of FIG. 5, the method of frame rate conversion may be dynamically controlled based on the scene. FIG. 6 is a flow chart showing a method for configuring frame rate conversion according to some aspects of the disclosure. A method 600 includes, at block 604 determining whether a scene condition is met. Block 604 may include, for example, determining whether a scene being captured by the image sensor is static or dynamic. If the scene is static, the frame rate conversion may be configured for repeating frame mode at block 606. In repeating frame mode, the FRC may duplicate frames to increase the frame rate. Determining whether a scene is static or dynamic may be based on whether local or global motion values. If the scene is dynamic, the frame rate conversion may be configured for motion interpolation mode at block 608. In motion interpolation mode, the FRC may interpolate a frame between two frames for insertion between the two frames.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform operations including determining a scene condition for an image sensor of an image capture device; receiving motion data regarding movement of the image capture device; configuring the image sensor of the image capture device with a first image sensor configuration determined based on the motion data and the scene condition; receiving image data from the image sensor captured with the first image sensor configuration; and determining a video sequence by processing the image data based on the motion data and the scene condition.

Additionally, the apparatus may perform or operate according to one or more aspects as described below. In some implementations, the apparatus includes a wireless device, such as a UE or BS. In some implementations, the apparatus may include at least one processor, and a memory coupled to the at least one processor. In some implementations, the apparatus may include a display and a first camera module comprising a first image sensor, with the at least one processor coupled to the first camera and the display. In some implementations, the apparatus may include a motion sensor, such as a gyroscope, accelerometer, and/or compass. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, configuring the image sensor comprises configuring the image sensor with a first readout duration based on the motion data indicating movement of the image capture device meets a first criteria.

In a third aspect, in combination with one or more of the first aspect or the second aspect, the method further includes configuring the image sensor with the first readout duration is further based on the scene condition indicating a low-light scene.

In a fourth aspect, in combination with one or more of the first aspect through the third aspect, the first criteria comprises a local motion below a local motion threshold and a global motion below a global motion threshold.

In a fifth aspect, in combination with one or more of the first aspect through the fourth aspect, configuring the image sensor with the first readout duration comprises configuring the image sensor with a first frame rate.

In a sixth aspect, in combination with one or more of the first aspect through the fifth aspect, processing the image data comprises performing frame rate conversion (FRC) on the image data to increase a frame rate of image data, wherein performing the frame rate conversion (FRC) is based on the motion data indicating movement of the image capture device meets a first criteria.

In a seventh aspect, in combination with one or more of the first aspect through the sixth aspect, performing frame rate conversion (FRC) comprises repeating frames in the image data to increase a frame rate when the motion data meets a second criteria.

In an eighth aspect, in combination with one or more of the first aspect through the seventh aspect, performing frame rate conversion (FRC) comprises motion interpolating frames in the image data to increase a frame rate when the motion data does not meet the second criteria.

In a ninth aspect, in combination with one or more of the first aspect through the eighth aspect, configuring the image sensor comprises configuring the image sensor with a first frame rate based on the motion data indicating movement of the image capture device meets a first criteria and the scene condition meets a second criteria.

In a tenth aspect, in combination with one or more of the first aspect through the ninth aspect, processing the image data comprises performing frame rate conversion (FRC) on the image data to increase a frame rate of image data from the first frame rate to a second frame rate higher than the first frame rate based on the motion data indicating movement of the image capture device meets the first criteria and the scene condition meets the second criteria.

In an eleventh aspect, in combination with one or more of the first aspect through the tenth aspect, the second criteria is a brightness level below a brightness threshold.

In a twelfth aspect, in combination with one or more of the first aspect through the eleventh aspect, performing frame rate conversion (FRC) comprises repeating frames in the image data to increase a frame rate when the motion data meets a third criteria.

In a thirteenth aspect, in combination with one or more of the first aspect through the twelfth aspect, performing frame rate conversion (FRC) comprises motion interpolating frames in the image data to increase a frame rate when the motion data does not meet the third criteria.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-6 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms “upper” and “lower” are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term “or,” when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, “or” as used in a list of items prefaced by “at least one of” indicates a disjunctive list such that, for example, a list of “at least one of A, B, or C” means A or B or C or AB or AC or BC or ABC (that is A and B and C) or any of these in any combination thereof. The term “substantially” is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term “substantially” may be substituted with “within [a percentage] of” what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:

determining a scene condition for an image sensor of an image capture device;

receiving motion data regarding movement of the image capture device;

configuring the image sensor of the image capture device with a first image sensor configuration determined based on the motion data and the scene condition;

receiving image data from the image sensor captured with the first image sensor configuration; and determining a video sequence by processing the image data based on the motion data and the scene condition, wherein processing the image data comprises performing frame rate conversion (FRC) on the image data to increase a frame rate of the image data based on the motion data indicating movement of the image capture device meets a first criteria, wherein performing FRC comprises repeating frames in the image data to increase a frame rate when the motion data meets a second criteria, and wherein the FRC is disabled when the scene condition does not meet a third criteria.

2. The method of claim 1, wherein:

configuring the image sensor comprises configuring the image sensor with a first readout duration based on the motion data indicating movement of the image capture device meets the first criteria.

3. The method of claim 2, wherein configuring the image sensor with the first readout duration is further based on the scene condition indicating a low-light scene.

4. The method of claim 2, wherein the first criteria comprises a local motion below a local motion threshold and a global motion below a global motion threshold.

5. The method of claim 2, wherein configuring the image sensor with the first readout duration comprises configuring the image sensor with a first frame rate.

6. The method of claim 1, wherein:

performing frame rate conversion (FRC) comprises motion interpolating frames in the image data to increase a frame rate when the motion data does not meet the second criteria.

7. The method of claim 1, wherein:

configuring the image sensor comprises configuring the image sensor with a first frame rate based on the motion data indicating movement of the image capture device meets the first criteria and the scene condition meets the third criteria, and performing frame rate conversion (FRC) comprises performing FRC on the image data to increase a frame rate of the image data from the first frame rate to a second frame rate higher than the first frame rate based on the motion data indicating movement of the image capture device meets the first criteria and the scene condition meets the third criteria.

8. The method of claim 1, wherein the third criteria is a brightness level below a brightness threshold.

9. The method of claim 8, wherein:

performing frame rate conversion (FRC) comprises motion interpolating frames in the image data to increase a frame rate when the motion data does not meet the second criteria.

10. An apparatus, comprising:

a memory storing processor-readable code; and at least one processor coupled to the memory, the at least one processor configured to execute the processor-readable code to cause the at least one processor to perform operations including:

determining a scene condition for an image sensor of an image capture device;

receiving motion data regarding movement of the image capture device;

configuring the image sensor of the image capture device with a first image sensor configuration determined based on the motion data and the scene condition;

receiving image data from the image sensor captured with the first image sensor configuration; and determining a video sequence by processing the image data based on the motion data and the scene condition, wherein processing the image data comprises performing frame rate conversion (FRC) on the image data to increase a frame rate of the image data based on the motion data indicating movement of the image capture device meets a first criteria, wherein performing FRC comprises repeating frames in the image data to increase a frame rate when the motion data meets a second criteria, and wherein the FRC is disabled when the scene condition does not meet a third criteria.

11. The apparatus of claim 10, wherein:

configuring the image sensor comprises configuring the image sensor with a first readout duration based on the motion data indicating movement of the image capture device meets the first criteria.

12. The apparatus of claim 11, wherein configuring the image sensor with the first readout duration is further based on the scene condition indicating a low-light scene.

13. The apparatus of claim 11, wherein the first criteria comprises a local motion below a local motion threshold and a global motion below a global motion threshold.

14. The apparatus of claim 11, wherein configuring the image sensor with the first readout duration comprises configuring the image sensor with a first frame rate.

15. The apparatus of claim 10, wherein:

performing frame rate conversion (FRC) comprises motion interpolating frames in the image data to increase a frame rate when the motion data does not meet the second criteria.

16. The apparatus of claim 10, wherein:

configuring the image sensor comprises configuring the image sensor with a first frame rate based on the motion data indicating movement of the image capture device meets the first criteria and the scene condition meets the third criteria, and performing frame rate conversion (FRC) comprises performing FRC on the image data to increase a frame rate of the image data from the first frame rate to a second frame rate higher than the first frame rate based on the motion data indicating movement of the image capture device meets the first criteria and the scene condition meets the third criteria.

17. The apparatus of claim 10, wherein the third criteria is a brightness level below a brightness threshold.

18. The apparatus of claim 17, wherein:

performing frame rate conversion (FRC) comprises motion interpolating frames in the image data to increase a frame rate when the motion data does not meet the second criteria.

19. A non-transitory computer-readable medium storing instructions that, when executed by a processor, cause the processor to perform operations comprising:

determining a scene condition for an image sensor of an image capture device;

receiving motion data regarding movement of the image capture device;

configuring the image sensor of the image capture device with a first image sensor configuration determined based on the motion data and the scene condition;

receiving image data from the image sensor captured with the first image sensor configuration; and determining a video sequence by processing the image data based on the motion data and the scene condition, wherein processing the image data comprises performing frame rate conversion (FRC) on the image data to increase a frame rate of the image data based on the motion data indicating movement of the image capture device meets a first criteria, wherein performing FRC comprises repeating frames in the image data to increase a frame rate when the motion data meets a second criteria, and wherein the FRC is disabled when the scene condition does not meet a third criteria.

20. The non-transitory computer-readable medium of claim 19, wherein configuring the image sensor comprises configuring the image sensor with a first readout duration based on the motion data indicating movement of the image capture device meets the first criteria.

21. The non-transitory computer-readable medium of claim 19, wherein:

configuring the image sensor comprises configuring the image sensor with a first frame rate based on the motion data indicating movement of the image capture device meets the first criteria and the scene condition meets the third criteria, and performing frame rate conversion (FRC) comprises performing FRC on the image data to increase a frame rate of the image data from the first frame rate to a second frame rate higher than the first frame rate based on the motion data indicating movement of the image capture device meets the first criteria and the scene condition meets the third criteria.

22. The non-transitory computer-readable medium of claim 19, wherein the third criteria is a brightness level below a brightness threshold.

23. The non-transitory computer-readable medium of claim 22, wherein:

performing frame rate conversion (FRC) comprises motion interpolating frames in the image data to increase a frame rate when the motion data does not meet the second criteria.

24. An image capture device, comprising:

a display;

a motion sensor;

a first camera comprising a first image sensor;

a memory storing processor-readable code; and at least one processor coupled to the memory, to the motion sensor, to the display, and to the first camera, the at least one processor configured to execute the processor-readable code to cause the at least one processor to perform operations including:

determining a scene condition for the first image sensor;

receiving motion data based on output from the motion sensor, the motion data indicating a movement of the image capture device;

determining an image capture configuration, the image capture configuration comprising: a first image sensor configuration comprising a frame rate value; and a frame rate conversion (FRC) configuration, the image capture configuration based on the motion data and the scene condition;

configuring the first image sensor based on the image capture configuration;

receiving image data from the first image sensor captured with the first image sensor configuration; and determining a video sequence by processing the image data based on the image capture configuration, wherein determining an image capture configuration comprises determining to include FRC when processing the image data based on the motion data indicating movement of the image capture device meets a first criteria, wherein determining the image capture configuration comprises determining repeating frames for FRC in the image data to increase a frame rate when the motion data meets a second criteria, and wherein the FRC is disabled when the scene condition does not meet a third criteria.

25. The image capture device of claim 24, wherein determining an image capture configuration comprises determining the frame rate value to be a first frame rate based on:

the motion data indicating movement of the image capture device meets the first criteria, and a brightness level for a scene of the first image sensor meets the third criteria.

26. The image capture device of claim 25, wherein determining to include frame rate conversion (FRC) when processing the image data is further based on:

a brightness level for a scene of the first image sensor meets the third criteria.

27. The image capture device of claim 26, wherein determining the image capture configuration comprises:

determining motion interpolating frames for frame rate conversion (FRC) in the image data to increase a frame rate when the motion data does not meet the second criteria.

28. The image capture device of claim 25, further comprising: displaying the video sequence on the display, wherein the video sequence has a second frame rate higher than the first frame rate.

* * * * *